United States Patent [19]
Jeknavorian et al.

[11] Patent Number: 5,641,352
[45] Date of Patent: Jun. 24, 1997

[54] NITROGENOUS STRENGTH ENHANCERS FOR PORTLAND CEMENT

[75] Inventors: Ara A. Jeknavorian, Chelmsford; Leslie Jardine, Andover, both of Mass.

[73] Assignee: W.R. Grace & Co.-Conn., New York, N.Y.

[21] Appl. No.: 547,838

[22] Filed: Oct. 25, 1995

[51] Int. Cl.$^6$ .................................................. C04B 24/12
[52] U.S. Cl. .................... 106/808; 106/725; 106/727; 106/806; 106/819; 106/820; 106/822; 106/823
[58] Field of Search .................................. 106/727, 808, 106/823, 806, 725, 819, 820, 822

[56] References Cited

U.S. PATENT DOCUMENTS

| | | | |
|---|---|---|---|
| 2,900,265 | 8/1959 | Klein | 106/91 |
| 3,325,105 | 6/1967 | Veltman | 241/16 |
| 3,329,517 | 7/1967 | Dodson et al. | 106/90 |
| 3,661,603 | 5/1972 | Nicol | 106/90 |
| 4,365,999 | 12/1982 | Fujita et al. | 106/808 |
| 4,401,472 | 8/1983 | Gerber | 106/808 |
| 4,473,405 | 9/1984 | Gerber | 106/90 |
| 4,818,288 | 4/1989 | Aignesberger et al. | 106/90 |
| 4,943,323 | 7/1990 | Gartner et al. | 106/808 |
| 5,069,721 | 12/1991 | Tamura et al. | 106/727 |
| 5,156,679 | 10/1992 | Gartner et al. | 106/823 |
| 5,211,751 | 5/1993 | Arfaei et al. | 106/819 |
| 5,326,397 | 7/1994 | Abdelrazig et al. | 106/823 |
| 5,429,675 | 7/1995 | Cheung et al. | 106/802 |

FOREIGN PATENT DOCUMENTS

| | | | |
|---|---|---|---|
| 60-60962 | 4/1985 | Japan | 106/808 |
| 1038314 | 8/1983 | U.S.S.R. | 106/727 |

OTHER PUBLICATIONS

1977 Publication, Krasnodar Dept. of the Correspondence Institute of Soviet Trade, Title: "Influence of Organic Acids on the Setting of Patching Portland Cement Solutions at High Temperature and Pressures" by: F. G. Mamulov, D. A. Loskutov, and A. A. Tikhomirov No Month.

*Primary Examiner*—Anthony Green
*Attorney, Agent, or Firm*—Craig K. Leon; William L. Baker

[57] ABSTRACT

An early strength-enhancing admixture and cement composition is disclosed. The admixtures incorporate strength-enhancing components selected from the group consisting of a. a nitrogenous compound of the formula

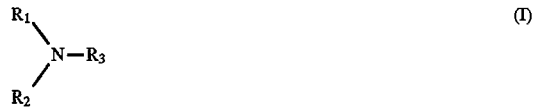

(I)

wherein
$R_1 = R_5 A$;
$R_2 = R_5 A$, $R_5 OH$, $-OR_6$, $-R_6$, $-H$, or Z;
$R_3 = R_5 A$, $R_5 OH$, $-OR_6$, $-R_6$, $-H$, or Z;
A = $-COOH$ or $-SO_3 H$ (or salts thereof)
Z =

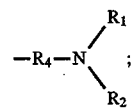

$R_4$ = an alkylene linking group;
$R_5 = C_1 - C_{10}$ alkylene;
$R_6 = C_1 - C_{10}$ alkyl;

and at least one of $R_2$ or $R_3$ is $R_5 A$, and b. a nitrogenous compound of the formula

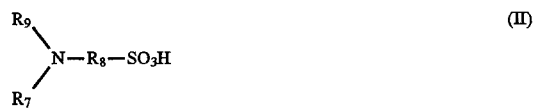

(II)

wherein
$R_7 = R_5 OH$;
$R_8 = R_5$, $-R_5 OH$;
$R_9 = -H$, $R_5 OH$.

15 Claims, No Drawings

NITROGENOUS STRENGTH ENHANCERS FOR PORTLAND CEMENT

FIELD OF THE INVENTION

This invention relates to improved hydraulic cement compositions and methods of making them. More particularly, this invention pertains to cement compositions such as Portland cement concretes, mortars, etc., having significantly enhanced early compressive strengths due to the incorporation therein of certain nitrogenous compounds.

BACKGROUND OF THE INVENTION

Optimizing the compressive strength of hydraulic cement, e.g., Portland cement, has been well-studied in the engineering and chemical arts. Many factors influence the compressive strength of cement compositions such as concrete, e.g.: the water-cement ratio (the weight ratio of water, exclusive of that absorbed by the aggregates, to cement); cement content or cement factor; temperature; physical properties and chemical composition of the cement. As to the chemical composition of the cement, chemical admixtures have been used to enhance the compressive strength of the cement composition (for brevity, the term "concrete" will be used herein to encompass concretes, mortars and pastes unless otherwise noted.) For example, alkanolamines such as ethanolamine, diethanolamine, triethanolamine; alkali and alkaline earth metal thiocyanates and nitrites; and halides are known to shorten the set time as well as enhance the one-to-three day compressive strength of cements.

Early, i.e., 1–3 day, compressive strength, is of some importance in the precast and prestress concrete industry, and for other uses where it is desirable and/or necessary for the poured concrete to be subjected to some immediate stress, i.e., foot traffic, etc. While early strength cements are available, they are not always suitable for a particular task. As such, it has been desired to find a chemical additive for Portland cement (which can be added before or after mixing with water and/or aggregates) which will increase the early compressive strength of the hardened concrete.

SUMMARY OF THE INVENTION

The present invention relates to cement admixtures containing a) a cement additive component; and b) a strength-enhancing component selected from the group consisting of a. a nitrogenous compound of the formula

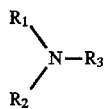  (I)

wherein
$R_1 = R_5A$;
$R_2 = R_5A$, $R_5OH$, $-OR_6$, $-R_6$, $-H$, or Z;
$R_3 = R_5A$, $R_5OH$, $-OR_6$, $-R_6$, $-H$, or Z;
$A = -COOH$ or $-SO_3H$ (or salts thereof)

Z=

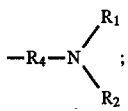

$R_4$=an alkylene linking group;
$R_5 = C_1-C_{10}$ alkylene;
$R_6 = C_1-C_{10}$ alkyl;
and at least one of $R_2$ or $R_3$ is $R_5A$, and b. a nitrogenous compound of the formula

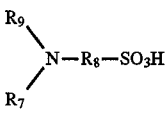  (II)

wherein
$R_7 = R_5OH$;
$R_8 = R_5$, $-R_5OH$;
$R_9 = -H$, $R_5OH$.

The cement additive component is selected from the group consisting of set accelerators and retarders; anti-freeze agents; strength-enhancers; shrinkage-reduction agents; corrosion inhibiting agents; superplasticizers and water reducers; air entraining or detraining agents; water repelling agents; and mixtures thereof.

The invention further relates to cement compositions containing the inventive strength-enhancing component, and to methods for making such cement compositions.

DETAILED DESCRIPTION OF THE INVENTION

The term "cement composition" as used herein refers to pastes, mortars and concrete compositions comprising a hydraulic cement binder. The above terms are terms of art. Pastes are mixtures composed of a hydraulic cement binder, for example, Portland cement, either alone or in combination with other components such as fly ash, silica fume or blast furnace slag, and water; mortars are pastes additionally including fine aggregate, and concretes are mortars additionally including coarse aggregate. The cement compositions of this invention are formed by mixing certain amounts of required materials, e.g., a hydraulic cement, water, and fine or coarse aggregate, as may be applicable for the particular cement composition being formed.

The term "concrete" as used herein includes a mixture of such hydraulic cements and inert aggregates. Typical aggregates include conventional "coarse" aggregates such as gravel, granite, limestone, quartz sieve, etc., as well as those materials conventionally referred to as "fine" aggregates such as sand and fly ash. Conventional hydraulic cement concretes, e.g., Portland cement concretes, employ major amounts of such aggregates, i.e. over 50% and usually up to about 75% by volume, in the set product.

The present invention is directed to certain nitrogenous compounds which, when added to cement compositions, enhance the early strength of the hardened cement. By early strength is meant compressive strength at 1–3 days, as measured by, e.g., ASTM C-39. As stated earlier, higher early compressive strength is desirable to allow the hardened concrete to be subjected to some limited stress before it is fully cured, i.e., at about 28 days.

These nitrogenous strength enhancing compounds are selected from the group consisting of:

a. a nitrogenous compound of the formula

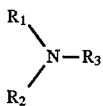 (I)

wherein
$R_1=R_5A$;
$R_2=R_5A$, $R_5OH$, $-OR_6$, $-R_6$, $-H$, or $Z$;
$R_3=R_5A$, $R_5OH$, $-OR_6$, $-R_6$, $-H$, or $Z$;
$A=-COOH$ or $-SO_3H$ (or salts thereof)
$Z=$

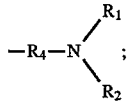

$R_4=$ an alkylene linking group;
$R_5=C_1-C_{10}$ alkylene;
$R_6=C_1-C_{10}$ alkyl;
and at least one of $R_2$ or $R_3$ is $R_5A$, and
b. a nitrogenous compound of the formula

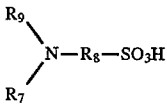 (II)

wherein
$R_7=R_5OH$;
$R_8=R_5$, $-R_5OH$;
$R_9=-H$, $R_5OH$.

In the above formulae $R_5$ and $R_6$ are advantageously $C_2$ to $C_5$, preferably $C_2$ to $C_3$. We have also found that good results were obtained when $A=-COOH$. The alkylene linking group $R_4$ is defined as a $C_1$ to $C_5$, advantageously $C_2$ to $C_5$, branched or unbranched alkylene group. The carbon atoms of this linking group may also contain other substituents, e.g., hydroxyl or halide substituents. The early strength enhancing additives of the invention may be used in combination with any cement additive compound, but are particularly beneficial when used in combination with set accelerators and superplasticizers (variously also known as "water reducing agents", "plasticizers", and "fluidizing agents"). These additives provide cement compositions with the necessary additional early strength for early foot traffic. The addition of the inventive admixture can therefore provide cement compositions having improved compressive strength at all stages of curing.

The amount of the inventive nitrogenous strength enhancing compounds used in cement compositions of the invention is generally at least 0.001 weight percent, and usually in the range of 0.005 to 5, preferably 0.05 to 1.0 weight percent, based on the weight of hydraulic cement binder in the composition. When used in admixture form, typically an aqueous solution, the nitrogenous strength enhancing compound can be present in a suitable concentration to allow for convenient dosing of cement; we have found suitable concentrations to range from 0.01 to 5.0% of nitrogenous strength enhancing compound by total weight of admixture solution.

Superplasticizers which may be used in the invention are those such as carbohydrates; such as saccharides and polysaccharides, for example, starch and derivatives thereof such as pregelatinized starch, dextrin, corn syrup, etc.; polyhydroxy polycarboxylic compounds such as tartaric acid and mucic acid; lignosulfonic acid and salts and derivatives thereof, for example, sodium lignosulfonate, naphthalene sulfonate-formaldehyde condensate, and melamine sulfonate-formaldehyde condensate; water soluble borates and silicones; and vinylpyrrollidone-based superplasticizers, etc., as well as mixtures of the foregoing. Other superplasticizers may be used, such as EO/PO superplasticizers, which are herein defined to mean any water-soluble polymeric compound that functions as a hydraulic cement dispersant or superplasticizer, and comprises a) polymeric backbone moiety and b) polymeric side chain moieties, wherein one of said a) and b) polymeric moieties is a polyether moiety, and the other is a non-polyether moiety formed by polymerization of ethylenically-unsaturated monomers. ("Water-soluble" means that the EO/PO superplasticizers should be soluble or dispersible in a 100% water medium, or a medium principally comprised of water, e.g., an aqueous alcohol medium containing a minor percentage of alcohol. The pH of the medium may be adjusted as necessary to cause or optimize polymer solubility.)

As used herein, "polyether moiety" means any homopolymer or copolymer having repeating units linked by carbon-oxygen ether linkages, which is capable of having ethylenically-unsaturated monomer or polymer side chains attached to the backbone; alternately, such polyethers may be attached to a backbone formed by polymerization of ethylenically-unsaturated monomers. The polyether moiety thus has repeating units of the formula $-(-O-R-)-$ wherein R is an organic moiety containing a carbon atom linked to the oxygen through a single covalent bond. The polyether moiety may contain two or more different repeating units with different R moieties.

When the polyether moiety is the backbone of the EO/PO superplasticizers, one or more of the repeating ether units may contain one or more carbon atoms which can function as side-chain attachment sites, e.g., by undergoing hydrogen or halogen abstraction. It is generally preferred that such side-chain attachment occur in the R moieties, although such sites may additionally or alternatively be provided by other groups or atoms which may be present in the polyether moiety.

R may be an arylene group, e.g., phenylene, provided that when the polyether moiety is the backbone of the polymer dispersant, other groups or moieties are present in the polymer which provide side-chain attachment sites; e.g., a divalent alkylaryl group wherein one of the alkyl carbon atoms is linked to the oxygen, e.g.,

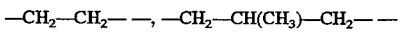

a saturated cyclic group, e.g., cyclohexylene; or a saturated or unsaturated, substituted or unsubstituted aliphatic group.

Saturated aliphatic groups are preferred R groups, particularly alkylene groups such as ethylene, propylene, butylene, isopropylene, or isobutylene. The preferred polyethers for use in the EO/PO superplasticizers (as either backbone or side chain polymer moieties) are accordingly polyoxyalkylene, e.g., polyoxyethylene homopolymers, polyoxypropylene homopolymers, and oxypropylene/oxyethylene copolymers. Polyoxyalkylenes are well known and a variety of such polymers are commercially available. Commercial polyoxyalkylenes which may be used in this invention include those sold under the PLURACOL, TETRONIC, and PLURONIC tradenames by BASF Wyandotte Corporation and under the JEFFAMINE and THANOL tradenames by Huntsman Chemical. The polyether moiety may include reactive groups, e.g., amine, carboxyl, or hydroxyl groups, positioned at the end of the polymer (when the polyether moiety is the backbone of the EO/PO superplasticizers) or at intermediate points along the polymer chain. When the polyether moiety is the backbone of the polymer dispersant, these groups may be derivatized before or after attachment of the side chains, if desired. Preferred polyoxyalkylene backbones, for example, include terminal hydroxyl groups arising from polymerization of the corresponding alkylene oxide. These hydroxyl groups may remain unreacted or may be derivatized before or after attaching the side chain(s) to provide, for example, urethane or ester derivatives.

A preferred number average molecular weight range, as determined by gel permeation chromatography, of the polyether backbone is preferably from about 200 to 30,000, and more preferably is in the range of about 500 to 10,000.

Where the backbone is a relatively hydrophobic polyether material, such that it has low water dispersibility or solubility, an appropriate non-polyether side chain moiety which imparts the desired solubility or dispersibility is attached to the polyether. Non-polyether side chain moieties used for this purpose should accordingly be more hydrophilic than the polyether backbone. Preferred non-polyether side chain moieties, from the standpoint of promoting water dispersibility and solubility, are those which contain salt-forming groups. The salt-forming groups may be provided by homopolymerizing or copolymerizing ethylenically unsaturated monomers containing an acid group, such as acrylic acid, methacrylic acid, or 2-sulfoethylmethacrylate, to form the side chain. Alternatively, monomers may be used which contain precursors which can be reacted after attachment to the polyether backbone to provide a salt-forming group, e.g., maleic anhydride may be incorporated into the side chain and subsequently hydrolyzed to the acid form. In general, after attachment the acid group is converted to its salt form by neutralization with a base. The salt-forming groups may also be provided by monomers containing a quaternary ammonium group or an amine group which can be quaternized after polymerization.

The ethylenically unsaturated monomers used in the EO/PO superplasticizers are polymerizable monomers characterized by the presence therein of at least one polymerizable ethylenic unsaturated group of the structure >C=C<. When the backbone of the EO/PO superplasticizers comprises a polyether moiety, such monomers which can be attached to the polyether to provide a EO/PO superplasticizers having a greater plasticizing capability than the polyether, and which permits water dispersibility or solubility of the EO/PO superplasticizers, can be used in this invention. The monomers can be used singly or in combination to produce homopolymer or copolymer side chains. Examples of ethylenically unsaturated monomers which can be used are the α,β-ethylenically unsaturated acids, e.g., acrylic acid, methacrylic acid, and itaconic acid; the α,β-ethylenically unsaturated acid esters, e.g., methyl acrylate, methylmethacrylate, ethylacrylate, 2-hydroxypropylacrylate, 2-hydroxypropylmethacrylate, 2-hydroxyethylmethacrylate, 2-hydroxyethylacrylate, 2-sulfoethylmethacrylate, 3-sulfopropylethacrylate, bis(3-sulfopropyl)itaconate, 2-phenoxyethlacrylate, tetrahydrofurfurylacrylate, cyclohexylmethacrylate, polyethylene glycol monomethacrylate, polypropylene glycol monoacrylate, and caprolactone acrylate monomers such as Tone M-100 monomer of Union Carbide Corp., the α,β-ethylenically unsaturated acid amides, e.g., acrylamide, methacrylamide, diacetone-acrylamide, dimethylaminopropylmethacrylamide, and 2-acrylamido-2-methylpropane sulfonic acid; ethylenically unsaturated acids and acid esters of the formula

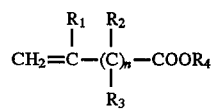

wherein $R_1$, $R_2$, $R_3$, and $R_4$ are each independently hydrogen or alkyl, and n is 1 to 20; vinyl esters such as vinyl acetate; vinyl ethers; vinyl ketones; vinyl aromatic monomers such as styrene and styrene sulfonic acid; N-vinylpyrrolidone; polymerizable acid anhydrides such as maleic anhydride and itaconic anhydride; aminoalkylacrylate and methacrylates, e.g., dimethylaminoethyl acrylate and diethylaminoethyl methacrylate; betaines such a N-(3-sulfopropyl)-N-methacryloxyethyl-N,N-dimethylammonium betaine; and cationic quaternary ammonium monomers such as the quaternized aminoalkyl acrylates and methacrylates. The α,β-ethylenically unsaturated acids are preferred monomers for use in this invention.

When the backbone of the EO/PO superplasticizers is a polyether moiety, it should be understood that, depending on the nature of the monomer, single monomeric units may become attached to the backbone. In particular, monomers conforming to the above formula (I) may attach in this manner. Accordingly, as used herein, the term "side chain" and "side chain polymer" broadly include and refer to attached moieties comprised of a single monomeric unit. Similarly, reference herein to the polymerization of ethylenically unsaturated monomers broadly includes the grafting of single monomeric units onto the polyether backbone.

Exemplary EO/PO superplasticizers comprising a polyether backbone which may be used are graft copolymer plasticizers like those described in U.S. Pat. No. 4,814,014, the disclosure of which is incorporated herein by reference. Such graft copolymer plasticizers comprise a polyether backbone polymer having an average molecular weight of about 200 to 30,000 and grafted side chain polymers prepared by polymerization of an ethylenically unsaturated monomer, wherein the graft copolymer plasticizer contains about 2% to 40% by weight of the side chain polymers.

When the EO/PO superplasticizers of the invention comprises a non-polyether moiety backbone, the backbone may be produced from the ethylenically-unsaturated monomers described hereinabove. The backbone may comprise a homopolymer or copolymer of said monomers. In certain preferred EO/PO superplasticizers comprising a non-polyether moiety backbone, i.e., as described in U.S. Pat. No. 4,946,904, the disclosure of which is incorporated herein by reference, the backbone is derived by copolymerization of a polyether, which is terminated at one end with a polymerizable ethylenically-unsaturated group, e.g., allyl or methacrylate, with a suitable comonomer. Particularly preferred comonomers are maleic acid, maleic anhydride, and acrylic acid. Furthermore, the same considerations applied to selecting the non-polyether moiety side chains pendent on a polyether moiety backbone (i.e., providing an EO/PO superplasticizer) having a greater plasticizing capability than the non-polyether backbone, and which permits water dispersibility or solubility of the EO/PO superplasticizers also apply when selecting the appropriate types and amounts of polyether moiety side chains to be attached to the non-polyether backbone.

The aforementioned EO/PO superplasticizers of U.S. Pat. No. 4,946,904, the disclosure of which is incorporated herein by reference, comprise a copolymer of an allyl-terminated polyoxyalkylene and maleic acid or anhydride. Preferred EO/PO superplasticizers of this type for use in the present invention are available under the name MALIALIM (NOF Corporation).

Other exemplary EO/PO superplasticizers are described in U.S. Pat. No. 5,393,343, and pending U.S. patent applications filed Jun. 21, 1995 Nos. 08/493,046 and 08/493,036 the entire disclosures of which are incorporated herein by reference. The compounds of the aforementioned U.S. Pat. No. 5,393,343 are imidized acrylic polymers or copolymers thereof. The polymer can be represented by the general formula

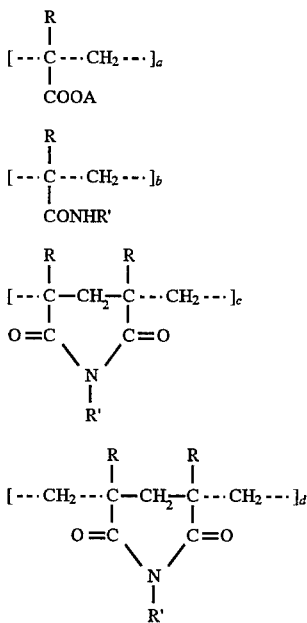

wherein each R independently represents a hydrogen atom or a methyl ($CH_3$—) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R'' represents a $C_1$–$C_{10}$ alkyl and n represents an integer of from 1-200, or mixtures thereof; and a, b, c and d are numerical values representing molar percentage of the polymer's structure such that a is a value of about 50 to 70; the sum of c+d is a value of from about 2 to the numerical value of (100–a); and b is a remainder value of [100–(a+c+d)].

The amount of superplasticizer used in the admixtures or cement compositions of the invention, whether as a dry blend of cement and admixture, or as formed in situ as part of the formation of a wet unset cement composition, should be an effective amount to either allow reduction of the water content while retaining equivalent slump of a blank composition, or increase the slump while maintaining the water to cement ratio, whichever is desired. The specific amount of this superplasticizer admixture for either purpose can be readily determined and will depend on the cement composition, the ratio of components of the composition, and the degree of fluidity desired. Generally, however, the amount will be at least 0.005 weight percent, and usually in the range of 0.005 to 5, preferably 0.03 to 1.0 weight percent, based on the weight of hydraulic cement binder in the composition.

Set accelerators which may be used in the invention are those such as calcium salts of halogen and pseudohalogen acids, viz., calcium chloride, bromide, thiocyanate, iodide, and perchlorate; calcium formate, thiosulfate, nitrate and nitrite; and calcium hydroxide. The effective amount of set accelerator will of course vary from compound to compound, but is generally at least 0.20 weight percent, and usually in the range of 0.40 to 4.0, preferably 0.35 to 1.75 weight percent, based on the weight of hydraulic cement binder in the composition. When used in admixture form, the superplasticizer can be present in a concentration of 0.05 weight percent.

When additional strength enhancers are incorporated in admixtures or cement compositions of the invention, these may be those such as silica fume (neat or in slurry form); alkanolamines, e.g., triethanolamine and triisopropanolamine; bicine; sarcosine; n-methyliminoacetic acid; iminodiacetic acid; and hydroxyethylglycine. Set retarders which may be used are, e.g., corn syrup; gluconates; glucoheptonates; borates; and sucrose. Exemplary anti-freeze agents are alkali and alkaline earth metal sulfates, aluminates, and carbonates. Shrinkage-reduction agents which may be used include ethers having the formula $R_1O(AO)_nH$ wherein A is a $C_2$–$C_4$ alkylene group or a combination of $C_2$–$C_4$ alkylene groups, n is 1–10, and $R_1$ is an alkyl or cycloalkyl group having 1 to 10 carbon atoms. $R_1$ may be, e.g., methyl, ethyl, propyl, isopropyl, n-butyl, isobutyl, tert-butyl, n-pentyl, isopentyl, cyclopentyl, and cyclohexyl. Examples of compounds conforming with the above formula are dipropylene glycol mono t-butyl ether and tripropylene glycol mono t-butyl ether. Other such agents may also comprise s certain lower alkylene glycols represented by the formula HOBOH, wherein B is a $C_3$–$C_{10}$ alkylene group, preferably a $C_5$–$C_8$ alkylene group. Examples of such lower alkylene glycols are 1,4-butanediol, 1,3-butanediol, 1,5-pentanediol, 1,6-hexanediol, 1,7 heptanediol, 1,4-pentanediol, 2-methyl-2,4 pentanediol; 4-methyl-2,4 pentanediol; and di t-butyl glycerin.. Corrosion inhibiting agents which may be used include alkali or alkaline earth metal nitrites, and alkylester emulsions. Air entraining or detraining agents which may be incorporated are ammonium, alkylammonium, and alkali salts of alkylbenzene sulfonic acid, fatty acids, and gum rosin acids.

The benefits of the invention can be seen by reference to the following non-limiting examples. All parts are by weight unless otherwise indicated. Compressive strength of all samples was measured in accordance with ASTM C-39. The mixing procedure used for mortars was modified from ASTM C-403. Concretes were prepared in accordance with ASTM C-192, section 6.1. Admixture, when added, was added with the mix water. After preparation, wet cement compositions were placed in metal cylinders and cured under controlled conditions, after which they were subjected to compressive strength measurements.

EXAMPLE 1

As shown in Table 1, the addition of Hampronol® (1,3 diamino-2-propanol-N'N"N'"N""tetraacetic acid (Hampshire Chemical Corporation, Lexington, Mass.) results in a marked improvement in the early compressive strength of the mortars tested.

TABLE 1

| Admixture | Dosage (% s/s) | 1 day PSI | % Ref Blank | 28 Day PSI | % Ref Blank |
|---|---|---|---|---|---|
| blank | 0 | 1571 | — | 6439 | — |
| Hampronol | 0.001 | 2130 | 136 | 6786 | 105 |
| Hampronol | 0.005 | 1802 | 115 | 6981 | 108 |
| Hampronol | 0.010 | 2033 | 129 | 6965 | 108 |
| Hampronol | 0.020 | 1837 | 117 | 6927 | 108 |

Mix design: 3500 g cement/7875 g sand/1575 g water

EXAMPLE 2

Table 2 demonstrates the beneficial effect of the addition of an admixture of the invention containing a known superplasticizer, naphthalene sulfonate-formaldehyde condensate ("NSFC"), and our early strength enhancer. The result demonstrated is a cement composition having improved early compressive strength.

TABLE 2

| Admixture | Dosage (% s/s) | 1 day PSI | % Ref | 28 Day PSI | % Ref |
|---|---|---|---|---|---|
| NSFC | 0.37 | 2021 | 100 | 7680 | 100 |
| NSFC/EDG | 0.37/0.005 | 2333 | 115 | 8031 | 105 |
| NSFC/EDG | 0.37/0.025 | 2524 | 125 | 7611 | 99 |

Mix design: 3500 g cement/7875 g sand/1575 g water

EXAMPLE 3

Table 3 illustrates the marked improvement in early compressive strength obtained by the addition of disodium ethanol diglycinate and tetrakis to concrete, while Table 4 shows the improvement in early compressive strength obtained by adding disodium ethanol diglycinate and sarcosine to mortar.

TABLE 3

| Admixture | Dosage (% s/s) | 1 day PSI | % Ref | 7 day PSI | % Ref | 28 Day PSI | % Ref |
|---|---|---|---|---|---|---|---|
| blank | 0 | 799 | — | 3116 | — | 4332 | — |
| disodium ethanol diglycinate ("EDG") | 0.025 | 1131 | 142 | 3898 | 125 | 4965 | 115 |
| EDG | 0.05 | 1054 | 132 | 3460 | 111 | 4996 | 115 |
| tetrakis | 0.025 | 889 | 111 | 3301 | 106 | 4618 | 107 |
| Hampronol | 0.05 | 823 | 103 | 3384 | 109 | 4652 | 107 |

Mix design: Cement Factor: 517 lb/yd³/Sand: 1400 lb/yd³/Aggregate: 1750 lb/yd³/Water: 300 lb/yd³

TABLE 4

| Admixture | Dosage (% s/s) | 1 day PSI | % Ref | 28 Day PSI | % Ref |
|---|---|---|---|---|---|
| Blank | 0 | 1982 | 100 | 7173 | 100 |
| sarcosine/EDG | 0.001/0.001 | 2144 | 108 | 7117 | 99 |
| sarcosine/EDG | 0.01/0.01 | 2339 | 118 | 6795 | 95 |

Mix design: 3500 g cement/7875 g sand/1575 g water

What is claimed is:

1. A cement admixture comprising (a) a cement additive component selected from the group consisting of set accelerators, set retarders, anti-freeze agents, strength enhancing agents, shrinkage reduction agents, corrosion inhibiting agents, superplasticizers, water-reducing agents, air entraining agents, air detraining agents, and water-repelling agents; and (b) a strength-enhancing component in an amount of at least 0.001 weight percent based on the weight of hydraulic cement binder in the composition into which said cement admixture is to be admixed, said strength enhancing component being different from said cement additive component of subsection (a) above and being selected from the group consisting of i) a nitrogenous compound of the formula

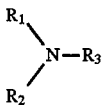 (I)

wherein
$R_1 = R_5A$;
$R_2 = R_5A$, $R_5OH$, $-OR_6$, $-R_6$, $-H$, or Z;
$R_3 = R_5A$, $R_5OH$, $-OR_6$, $-R_6$, $-H$, or Z;
$A = -COOH$, $-COO-$, $-SO_3H$, or $-SO_3-$;
Z =

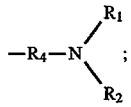

$R_4$ = an alkylene linking group;
$R_5 = C_2-C_5$ alkylene; and
$R_6 = C_1-C_{10}$ alkyl;
and wherein at least one of $R_2$ or $R_3$ is $R_5A$; and ii) a nitrogenous compound of the formula

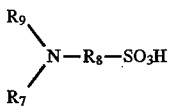 (II)

wherein
$R_7 = R_5OH$;
$R_8 = R_5$ or $-R_5OH$; and
$R_9 = -H$ or $R_5OH$.

2. The cement admixture of claim 1 wherein said cement additive component is selected from the group consisting of calcium chloride, calcium bromide, calcium thiocyanate, calcium iodide, calcium perchlorate, calcium formate, calcium thiosulfate, calcium nitrate, calcium nitrite, and calcium hydroxide.

3. The cement admixture of claim 1 wherein said cement additive component is a strength enhancer selected from the group consisting of silica fume; alkanolamines; bicine; sarcosine; n-methyliminoacetic acid; iminodiacetic acid; hydroxyethylglycine; and mixtures thereof.

4. The cement admixture of claim 1 wherein said cement additive component is a shrinkage reduction agent selected from the group consisting of ethers having the formula $R_1O(AO)_nH$ wherein A is a $C_2-C_4$ alkylene group or a combination of $C_2-C_4$ alkylene groups, n is 1–10, and $R_1$ is an alkyl or cycloalkyl group having 1 to 10 carbon atoms; lower alkylene glycols represented by the formula HOBOH, wherein B is a $C_3-C_{10}$ alkylene group; and mixtures thereof.

5. The cement admixture of claim 1 wherein said cement additive component is a corrosion inhibiting agent selected from the group consisting of alkali or alkaline earth metal nitrites; alkylester emulsions; and mixtures thereof.

6. The cement admixture of claim 1 wherein said cement additive component is an air entraining agent selected from the group consisting of ammonium, alkylammonium, and alkali salts of alkylbenzene sulfonic acid, fatty acids, and gum rosin acids; and mixtures thereof.

7. The cement admixture of claim 1 wherein said cement additive component is a superplasticizer selected from the group consisting of carbohydrates; polyhydroxy polycarboxylic compounds; polycarboxylic acids; lignosulfonic acid and salts and derivatives thereof; water soluble borates and silicones; EO/PO superplasticizers; and mixtures thereof.

8. The cement admixture of claim 1 wherein $R_6$ is $C_2$ to $C_5$.

9. The cement admixture of claim 1 wherein said strength-enhancing component is present in an amount of 0.01 to 1.2% of said strength-enhancing component by total weight of admixture.

10. A method of forming a cement composition comprising adding, to a mixture comprising hydraulic cement, a strength-enhancing agent in an amount of at least 0.001 weight percent based on the weight of said cement, said agent being operative to enhance the strength of the cement, said agent being selected from the group consisting of i) a nitrogenous compound of the formula

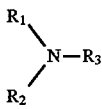 (I)

wherein
$R_1 = R_5A$;
$R_2 = R_5A$, $R_5OH$, $-OR_6$, $-R_6$, $-H$, or Z;
$R_3 = R_5A$, $R_5OH$, $-OR_6$, $-R_6$, $-H$, or Z;
$A = -COOH$, $-COO-$, $-SO_3H$, or $-SO_3^-$;
$Z=$

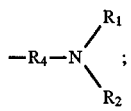

$R_4 =$ an alkylene linking group;
$R_5 = C_2-C_5$ alkylene; and
$R_6 = C_1-C_{10}$ alkyl;
and wherein at least one of $R_2$ or $R_3$ is $R_5A$; and ii) a nitrogenous compound of the formula

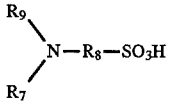 (II)

wherein
$R_7 = R_5OH$;
$R_8 = R_5$ or $-R_5OH$; and
$R_9 = -H$ or $R_5OH$.

11. A cement composition comprising hydraulic cement binder and a strength-enhancing agent operative to enhance the strength of the cement, said agent present in an amount of at least 0.001 weight percent based on the weight of said cement, said agent being selected from the group consisting of i) a nitrogenous compound of the formula

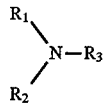 (I)

wherein
$R_1 = R_5A$;
$R_2 = R_5A$, $R_5OH$, $-OR_6$, $-R_6$, $-H$, or Z;
$R_3 = R_5A$, $R_5OH$, $-OR_6$, $-R_6$, $-H$, or Z;
$A = -COOH$, $-COO-$, $-SO_3H$, or $-SO_3^-$;
$Z=$

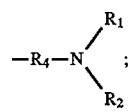

$R_4 =$ an alkylene linking group;
$R_5 = C_2-C_5$ alkylene; and
$R_6 = C_1-C_{10}$ alkyl;
and wherein at least one of $R_2$ or $R_3$ is $R_5A$; and ii) a nitrogenous compound of the formula

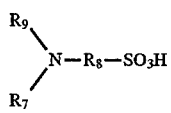 (II)

wherein
$R_7 = R_5OH$;
$R_8 = R_5$ or $-R_5OH$; and
$R_9 = -H$ or $R_5OH$.

12. The cement composition of claim 11 wherein the amount of said nitrogenous strength enhancing component is in the range of 0.005 to 5 weight percent, based on the weight of hydraulic cement binder in the composition.

13. The cement composition of claim 11 wherein the amount of said nitrogenous strength enhancing component is in the range of 0.05 to 1.0 weight percent, based on the weight of hydraulic cement binder in the composition.

14. The cement admixture of claim 11 wherein $R_6$ is $C_2$ to $C_5$.

15. The cement composition of claim 11 further comprising a cement additive component selected from the group consisting of set accelerators and retarders; anti-freeze agents; strength-enhancers; shrinkage-reduction agents; corrosion inhibiting agents; superplasticizers; air entraining and detraining agents; and mixtures thereof; said cement additive component being different from said nitrogenous compound having formula (I).

* * * * *